United States Patent
Robey et al.

[11] Patent Number: 5,902,027
[45] Date of Patent: May 11, 1999

[54] VERTICAL STACKING SYSTEM USING CONTROLLED ACCESS METHOD

[75] Inventors: Timothy J. Robey, Portland; Paul M. Roy, Jr., Lewiston, both of Me.

[73] Assignee: Bellheimer Metallwerk GmbH, Germany

[21] Appl. No.: 08/835,464

[22] Filed: Apr. 8, 1997

Related U.S. Application Data

[63] Continuation-in-part of application No. 08/549,167, Oct. 27, 1995.

[51] Int. Cl.⁶ .................................................. A47B 49/00
[52] U.S. Cl. ........................ 312/268; 312/138.1; 312/267
[58] Field of Search ..................................... 312/267, 268, 312/139.2, 97, 266, 91, 139, 312, 319.5, 223.1, 42; 221/76, 77, 78, 119, 120, 13, 241, 151; 182/222, 35, 33.5, 132; 52/190, 182, 609

[56] References Cited

U.S. PATENT DOCUMENTS

| | | | |
|---|---|---|---|
| 3,235,319 | 2/1966 | Anders et al. | 312/268 |
| 3,428,384 | 2/1969 | Goldammer | 312/267 X |
| 3,531,171 | 9/1970 | Raabe et al. | 312/268 |
| 3,907,068 | 9/1975 | Ulerich | 182/132 X |
| 4,226,062 | 10/1980 | Doane | 52/186 X |
| 5,249,855 | 10/1993 | Franklin et al. | 312/138.1 X |
| 5,269,597 | 12/1993 | Yenglin et al. | 312/42 |

FOREIGN PATENT DOCUMENTS

| | | | |
|---|---|---|---|
| 3610347 | 10/1987 | Germany | 312/268 |

OTHER PUBLICATIONS

Hanel carousel publication, 1 page showing automatic compartment doors on a storage/retrieval unit.

Remstar catalog, 2 pages showing various retrieval units.

Powermation Inc., Product Retrieval System publication, 1 page showing computer controlled storage system.

*Primary Examiner*—Peter M. Cuomo
*Assistant Examiner*—James O. Hansen
*Attorney, Agent, or Firm*—Evenson, McKeown, Edwards & Lenahan, P.L.L.C.

[57] ABSTRACT

In a vertical carousel storage and retrieval unit and the like, a restricted multi-compartment tote is used in conjunction with a height control such as a plurality of blocking rail. The tote is step-shaped and extends into the full depth of the unit. The blocking rail system allows sliding doors to be moved to one or more intermediate positions between fully open and fully closed positions in order to provide restricted authorized access to each of the compartments in sequential order from the first compartment at the front of the tote to the last compartment at the rear of the tote.

8 Claims, 5 Drawing Sheets

VERTICAL STACKING SYSTEM USING CONTROLLED ACCESS METHOD

CROSS-REFERENCE TO RELATED APPLICATION

This application is a Continuation-in-Part of copending application Ser. No. 08/549,167, filed Oct. 27, 1995, the disclosure of which is incorporated by reference herein.

BACKGROUND AND SUMMARY OF THE INVENTION

The present invention relates to an improvement in the vertical stacking system described in U.S. patent application Ser. No. 08/549,167. More particularly, the present invention relates to an improved vertical carousel in which sliding doors use blocking rails or any other height control system in combination with restricted access totes. Reference is made to said U.S. patent application for a discussion of storage and retrieval equipment of this type in general and of a vertical storage system with restricted access.

One potential disadvantage of current sliding door vertical storage systems is that they do not permit utilization of the entire depth of the carrier. Moreover, access is restricted to one part at a time.

In addition, even with the improvements found in the sliding door system described in U.S. patent application Ser. No. 08/549,167, each carrier, although providing for subdivision left to right into different size compartments, requires a depth of fixed amount, e.g., about 15 inches. This requirement has been found to make difficult, at least in certain situations, the storage of smaller size parts.

An object of the present invention is to provide an improved sliding door system in which a specially configured tote, in combination with a height control system such as a blocking rail arrangement and the like permits the entire depth of the storage system to be utilized while restricting access to one part at a time.

It is another object of the present invention to provide a tote which advantageously permits the depth of the storage system to be subdivided into multiple compartments, e.g., three or more.

DESCRIPTION OF THE DRAWINGS

Figure 7:
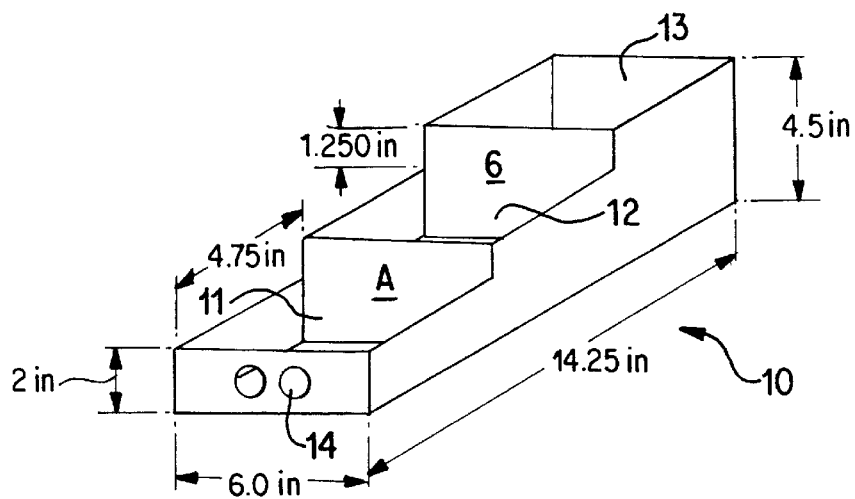
FIG. 7 is a schematic perspective view of the tote used in FIGS. 1 to 6 and illustrating exemplary dimensions.

FIGS. 1 to 6 are schematic perspective views of the sliding door system using the restricted tote configuration 10, shown with exemplary dimensions in FIG. 7 and blocking rail system of the present invention as hereinafter described. The general operation of the carousel is described in U.S. patent application Ser. No. 08/548,167. Therefore, further discussion of that operation will not be necessary to enable one skilled in this art to make and use the present invention.

Figure 1:
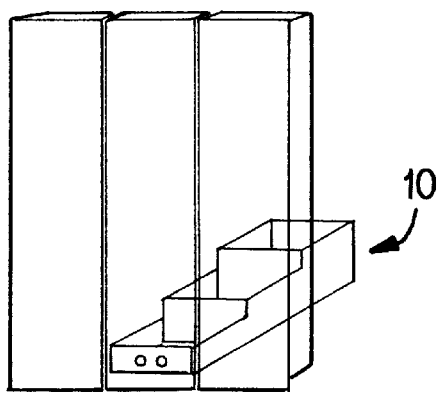
FIGS. 1 to 6 are schematic perspective views of a three door section of a vertical carousel storage and retrieval system showing how one of the three doors is sequentially moved to different heights to permit restricted access to different compartments in a step-shaped tote or carrier.

In particular, FIG. 1 shows the initial state of a three-compartment tote before a "pick" operation is initiated. As can be seen in the figures, the tote 10 permits the same part to be stored in each of the three compartments 11, 12, 13 (see also FIG. 7). A basic operation of the system is now described with reference to FIGS. 2 to 6.

Figure 2:
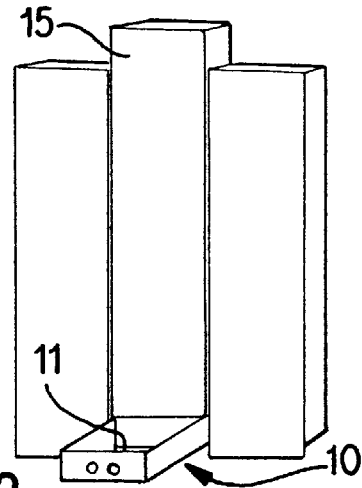

A user accesses the carousel using an ID# or password, then requests a part or tool to be picked. The carousel then rotates to the proper location and the door 15 slides open exposing only the first level of the restricted access tote as shown in FIG. 2. The tote 10 is pulled out, via finger holes 14, until it reaches its first blocking step exposing compartment 11 and the small part therein. The blocking step 7 prevents the user from gaining access to part located in the next depth location 12. That is, the wall A between the compartments 11, 12 is sized so that it can be moved past the door 15 which has opened to a specific height which interferes in this case with further movement of the tote 10 outside the storage system.

Figure 3:
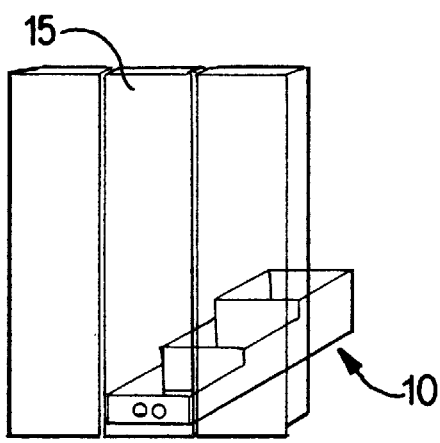
Figure 4:
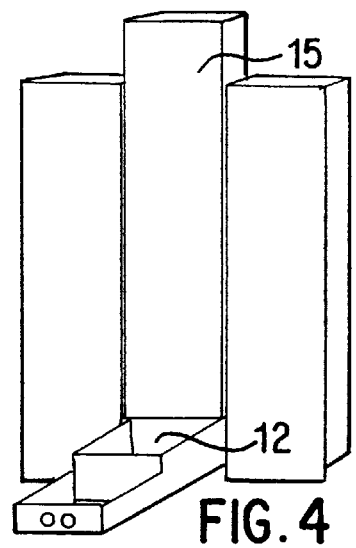
Figure 5:
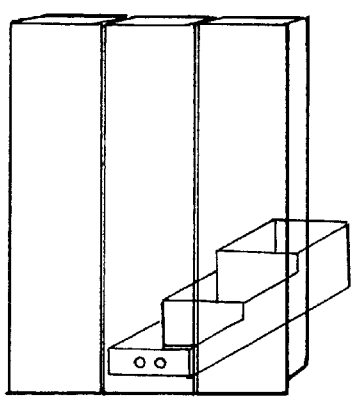
Figure 6:
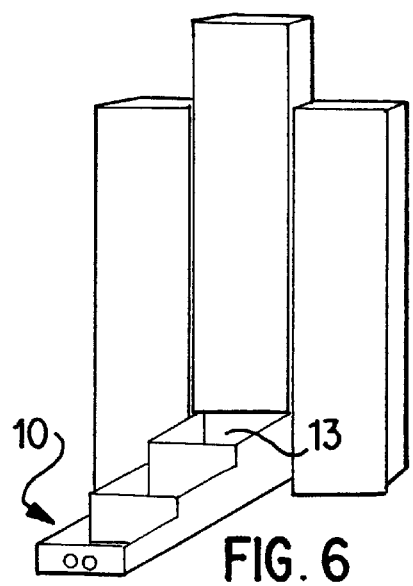

After the desired part has been picked, the restricted access tote 10 is then pushed back into the carrier and the door returns to the closed position as seen in FIG. 3 which is identical to FIG. 1 except that compartment 11 is now empty. Another user approaches the unit at a later time and requires the same part. The necessary identification steps are taken to gain access to the unit, and the required part number is entered. The carousel then rotates, to the required position, in the manner described in U.S. patent application Ser. No. 08/549,167 and the door 15 again slides open to the required height as seen in FIG. 4. This time, however, with the assistance of software which can be implemented by one skilled in this art without the exercise of unnecessary experimentation or labor, the door 15 slides open to the height of the second level. The software knows that the part in the first depth position 11 has already been picked and that opening the door 15 to the second depth position will not jeopardize the security of that first part. The restricted access tote 10 is then pulled out, via the finger holes 14, until it reaches the second blocking step B exposing compartment 12.

Once the second transaction is complete, the restricted access tote 10 is then pushed back into the carrier and the system returns to its original state (FIG. 5) and is again ready for another transaction. The third compartment 13 is accessed in the same manner as described above. The difference is that the entire tote 10 is now capable of being removed from the storage system. Restocking of the restricted access tote compartments 11, 12, 13 is greatly simplified because the tote 10 can be removed. Reports can be generated, via software, that will allow the person in charge of stocking the units to know which restricted access totes are empty. That person could then proceed to fill another tote with the required number of parts and replace the empty tote with the new loaded tote.

Figures 8, 9:
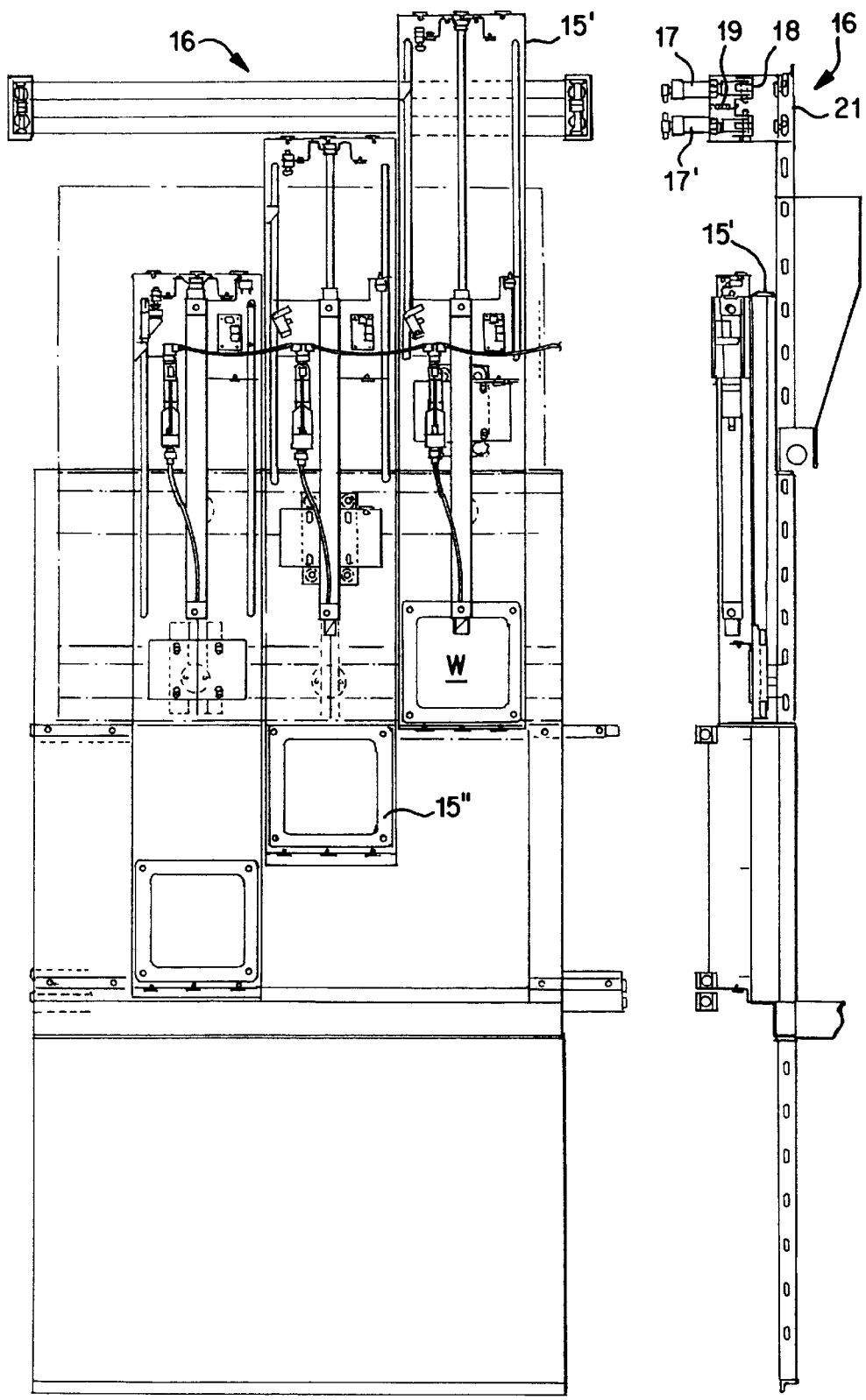
FIGS. 8 and 9 are, respectively, front and side views of a sliding door system without the restricted tote and with details of one blocking rail system shown to illustrate the fully closed, half open and fully open positions of the door.

As seen in FIGS. 8 and 9, which represent a more detailed showing of the sliding door system depicted in FIGS. 1–6, except for the restricted, stepped-shaped tote, a single blocking rail system is designated generally by numeral 16. It will be appreciated, however, that the other types of height control mechanisms and systems other than a blocking rail system can be used within the contemplation of the present invention. As seen in FIG. 9, and particularly in FIG. 11, conventional pneumatic actuators 17, 17' are used to engage and disengage the blocking rail 18 which is biased by springs (not shown) within the actuators 17, 17' as well as by tension spring 19 to prevent upward movement of the sliding door 15' in the illustrated default positions of the blocking rail 18. When the actuators 17, 17' are actuated toward the right, the blocking rail 18 moves into space 20 so that the sliding door 15' can be moved up to the required height and down when a part has been removed from the tote compartment associated with that height. Details of the sliding door 15' having a transparent viewing window W shown in FIG. 8 can be dispensed with as they are unnecessary to understand the present invention and are, to the extent important, already shown and described in U.S. patent application Ser. No. 08/549,167.

It will, of course, be appreciated that the three adjacent doors shown in FIG. 8 do not assume the illustrated position at the same time. That is, middle door 15" is not open when door 15' is also opened to any position. The drawing figure is merely intended to show that, with one blocking rail (another embodiment of which is illustrated and described in said U.S. patent application) the doors can be moved from a fully closed position to a fully open position with an intermediate position (door 15" in FIG. 8) determined by the location of the blocking rail 16.

Figure 11:
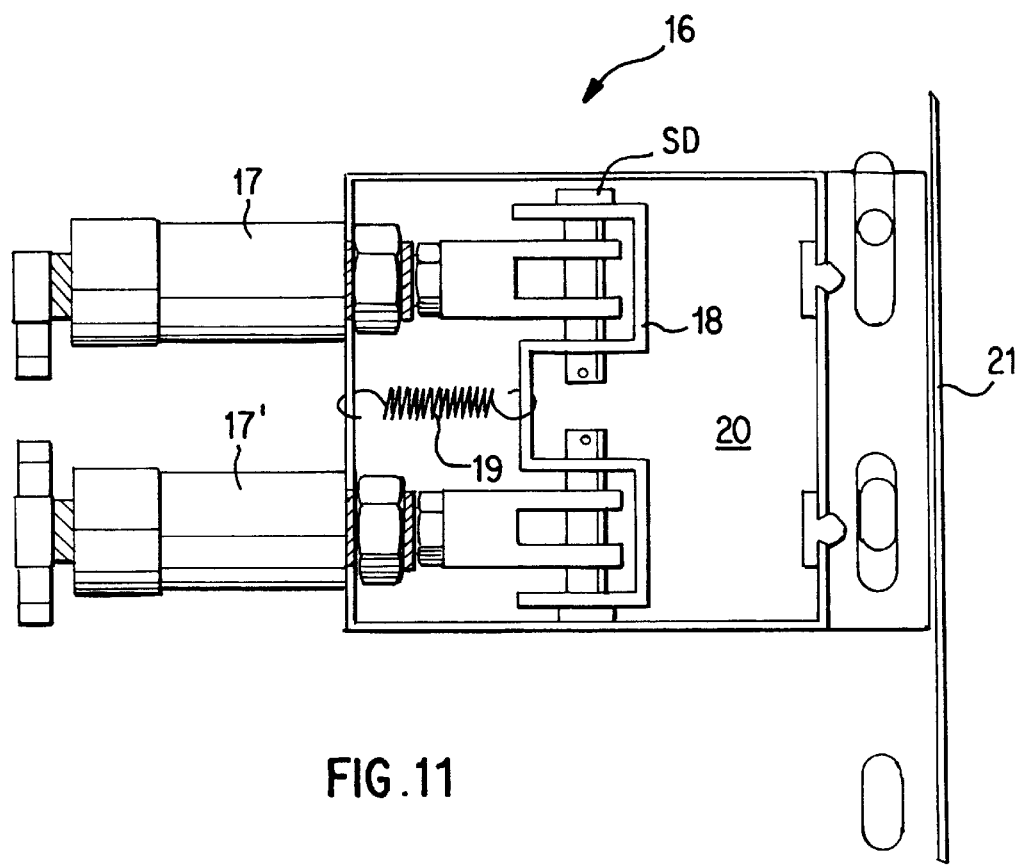
FIG. 11 is a schematic side view of the blocking rail shown in FIGS. 8–10.

Each blocking rail system 16 can comprise either two or four pneumatic piston actuators 17, 17' depending upon the rail size and weight. Typically, the piston actuators 17, 17' are mounted on the left and right sides of the upper access panel opening, where they are not accessible from the exterior of the storage system. The crenelated-shaped blocking rail bar 18 is then securely connected with conventional securing devices SD with ends of the pistons 17, 17' across the front panel 21 area. The blocking rail bar 18 in FIG. 11 is shown in the non-actuated position. That is, the springs within the actuators 17, 17' and also the spring 19 bias the bar 18 leftwardly, thereby defining the space 20. In this neutral or unactuated state, the blocking rail blocks movement of the associated door. Only when the rail bar 18 is moved into the space 20 will the door be allowed to move up. Thus, in the even of a power failure, an automatic or default blocking takes place to prevent unauthorized access to the contents.

Figure 10:
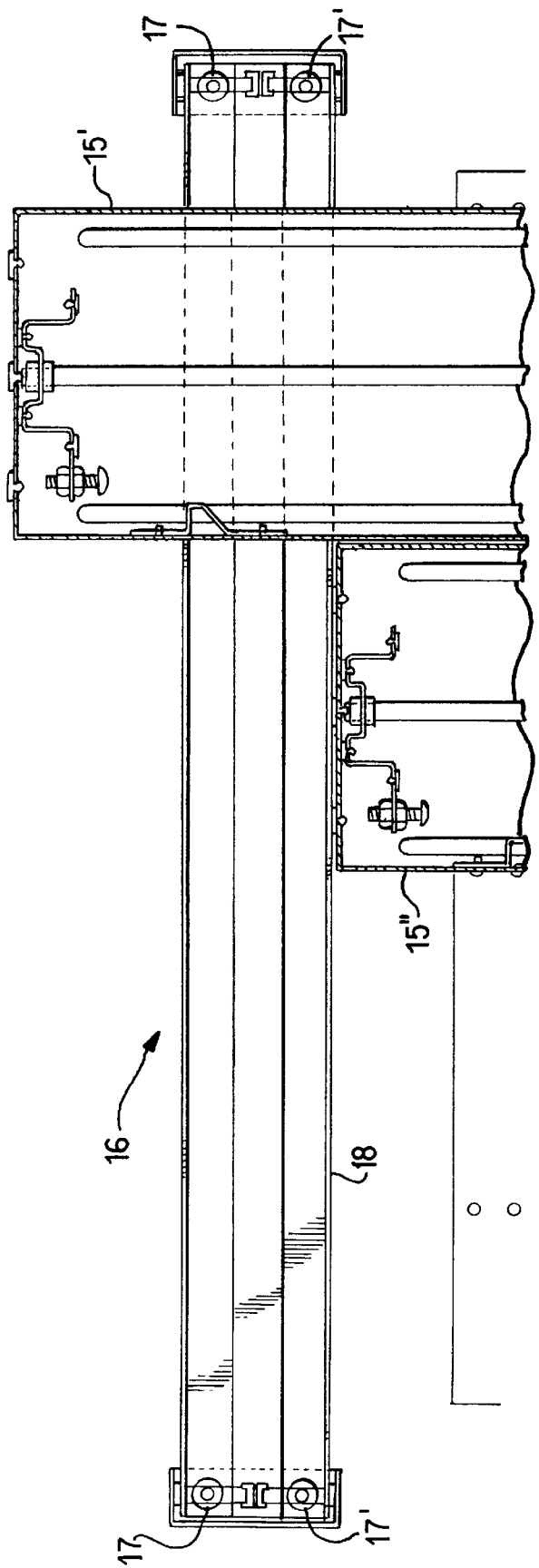
FIG. 10 is a partial front view corresponding to FIG. 8 but showing further details of the single blocking rail.

FIG. 10, which is similar to FIG. 8 but shows only the tops of doors 15', 15", again illustrates the door 15' fully opened and the door 15" blocked by the single blocking rail system 16. Also, the black areas represent rubber stoppers to dampen the forces caused by contact between the doors 15', 15" and the blocking rail bar 18.

Figure 12:
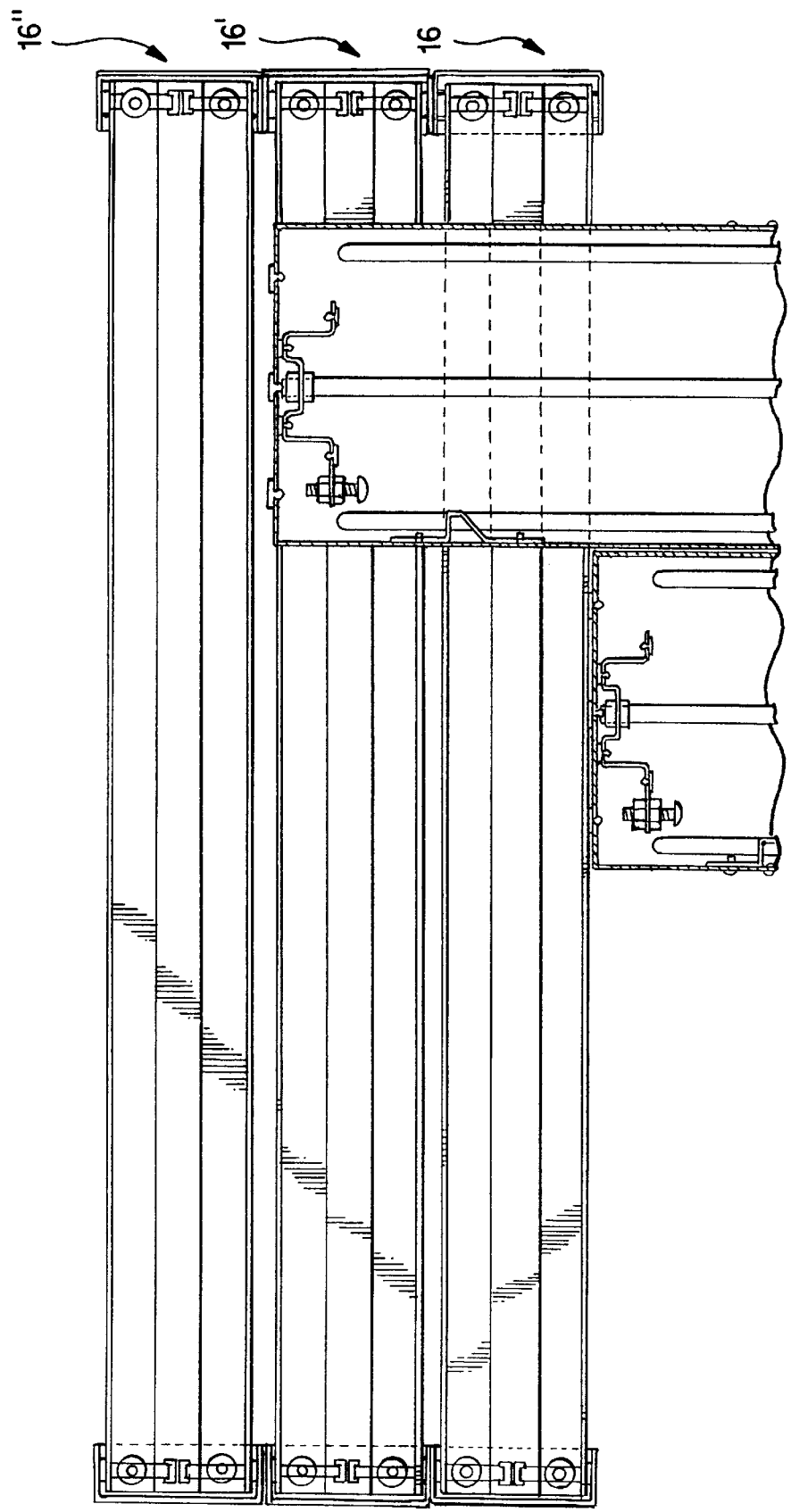
FIG. 12 is a view similar to FIG. 10 but showing an array of three blocking rails to permit opening of the sliding door to different heights for the tote shown in FIG. 7 and the sequence of steps shown in FIGS. 1–6.

FIG. 12 shows an array of three identically constructed blocking rail systems 16, 16', 16". By way of illustration only and without limiting the scope of the present invention, the illustrated blocking rail system can be mounted on 3 inch centers to provide for three intermediate positions of the sliding doors between fully closed and fully opened on a wide unit, e.g., one quarter open, one half open, and three quarters open. Also, the blocking rail systems can be mounted on 1¼ inch centers for providing more intermediate stops for the sliding doors, e.g., seven stops.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A storage and retrieval unit, comprising at least one sliding door to provide restricted access to an interior space in the unit, a height control system configured and arranged to permit movement of at least one sliding door to one or more positions between a fully closed position and a fully open position, and a step-shaped tote configured to be received in the interior space and provided with multiple compartments corresponding to a number of the positions permitted by the height control system.

2. The storage and retrieval unit according to claim 1, wherein the height control system is a blocking rail arrangement which comprises at least one bar located above the at least one sliding door and is actuatable to be moved into an unblocked state from a neutral blocked state.

3. The storage and retrieval unit according to claim 2, wherein a biasing means retains the at least one bar in the neutral blocked state.

4. The storage and retrieval unit according to claim 1, wherein the height control system is configured to be actuated pneumatically.

5. The storage and retrieval unit according to claim 1, wherein the tote has a first compartment configured to be accessed through the associated sliding door in a first position from the fully closed position and a final compartment configured to be accessed with the associated sliding door in he fully opened position.

6. A method for storing and retrieving articles, comprising the steps of (a) placing a predetermined number of articles in each of a plurality of compartments of a tote having a step-shape, wherein the compartments are arranged one behind the other;

(b) inserting the tote through an open sliding door of a storage and retrieval unit such that the compartments are aligned away from the sliding door into a interior of the unit;

(c) selectively and, with authorization, accessing the tote to withdraw one or more articles therefrom;

(d) opening the sliding door associated with the selected tote to a height sufficient to access only to a first compartment closest to the sliding door and containing the selected articles;

(e) closing the sliding door after step (d);

(f) repeating step (c); and (g) repeating step (d).

7. The method according to claim 7, wherein step (d) comprises actuating a height control to limit movement of the door to the sufficient height.

8. The method according to claim 6, wherein step (a) is repeated after the articles have been removed from each of the compartments.

* * * * *